United States Patent [19]
Takahashi et al.

[11] Patent Number: 6,008,778
[45] Date of Patent: Dec. 28, 1999

[54] VISUAL DISPLAY APPARATUS

[75] Inventors: Koichi Takahashi, Hachioji; Takayoshi Togino, Koganei, both of Japan

[73] Assignee: Olympus Optical Co., Ltd., Tokyo, Japan

[21] Appl. No.: 09/022,010

[22] Filed: Feb. 11, 1998

[30] Foreign Application Priority Data

Mar. 4, 1997 [JP] Japan .................................. 9-049007

[51] Int. Cl.$^6$ ..................................................... G09G 5/00
[52] U.S. Cl. ..................................... 345/7; 345/9; 359/630
[58] Field of Search ........................... 345/7, 9; 359/630, 359/631

[56] References Cited

U.S. PATENT DOCUMENTS

| | | | |
|---|---|---|---|
| 4,743,964 | 5/1988 | Allard et al. . | |
| 4,864,390 | 9/1989 | McKechnie et al. | 340/784 |
| 4,927,234 | 5/1990 | Banbury et al. | 350/174 |
| 4,948,378 | 8/1990 | Togino et al. | 359/633 |
| 5,157,503 | 10/1992 | Dugdale . | |
| 5,161,480 | 11/1992 | Furuya et al. . | |
| 5,198,928 | 3/1993 | Chauvin . | |
| 5,357,277 | 10/1994 | Nakayoshi et al. . | |
| 5,408,346 | 4/1995 | Trissel et al. . | |
| 5,706,137 | 1/1998 | Kelly | 359/633 |
| 5,880,888 | 3/1999 | Schoenmakers et al. | 359/631 |
| 5,926,318 | 7/1999 | Hebert | 359/618 |

FOREIGN PATENT DOCUMENTS 41 27 924  7/1994  Germany .

OTHER PUBLICATIONS

Patent Abstract of Japan No. 3–188777, Aug. 16, 1991, N. Kamaya.
Patent Abstract of Japan No. 6–308425, Apr. 11, 1994, S. Okada et al.

*Primary Examiner*—Richard A. Hjerpe
*Assistant Examiner*—Kimnhung Nguyen
*Attorney, Agent, or Firm*—Pillsbury Madison & Sutro LLP

[57] ABSTRACT

A head-mounted visual display apparatus which uses two or more two-dimensional display devices and which is compact, lightweight and enables an image which is clear as far as the periphery of the observation image field to be observed at a wide field angle and high resolution. The apparatus has a first two-dimensional display device (4) and a second two-dimensional display device (5). An ocular optical system (3) includes a first surface (11) having both reflecting and transmitting actions, a second surface (12) having at least reflecting action, and a third surface (13) having at least reflecting action. The first surface (11) is disposed to face an observer's eyeball (6). The second surface (12) is disposed to face the first surface (11). The third surface (13) is disposed to face the first surface (11) in a side-by-side relation to the second surface (12). Thus, images displayed by the first and second two-dimensional display devices (4 and 5) are led to the observer's eyeball (6).

18 Claims, 10 Drawing Sheets

FIG. 8
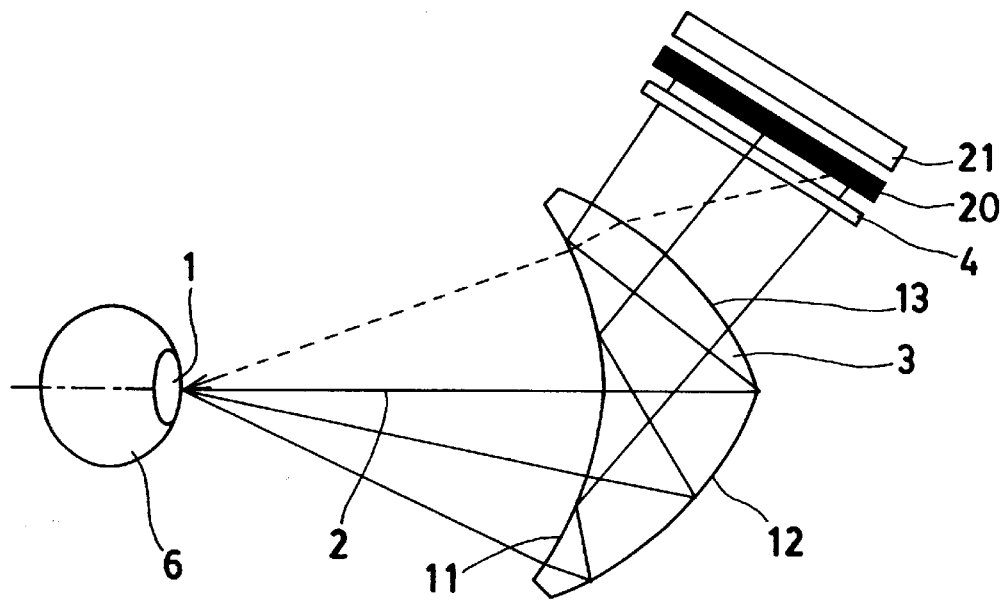
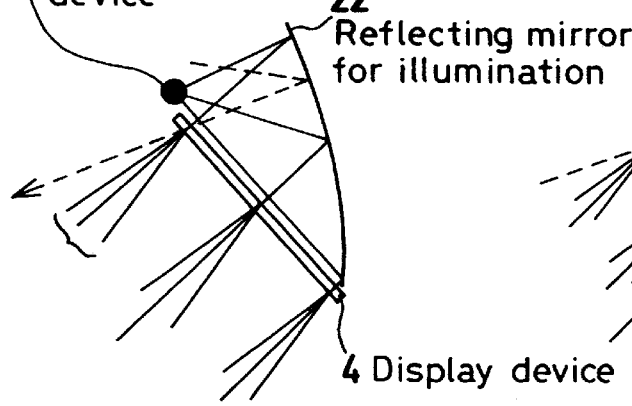
FIG. 9(a)
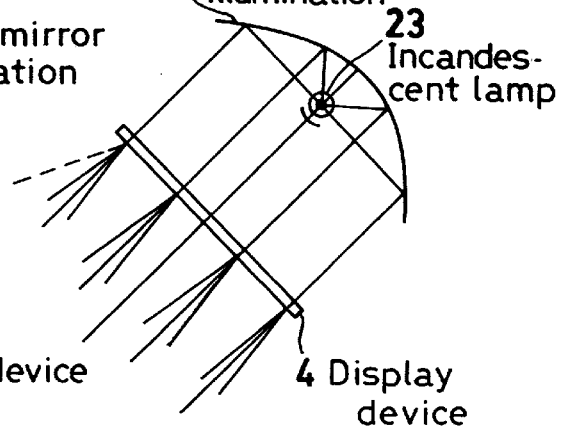
FIG. 9(b)

VISUAL DISPLAY APPARATUS

BACKGROUND OF THE INVENTION

The present invention relates to a visual display apparatus and, more particularly, to a visual display apparatus, e.g. a head-mounted display apparatus, which enables observation of an image at a wide field angle and high resolution.

In recent years, helmet- and goggle-type head-mounted display apparatuses have been developed for virtual reality or for the purpose of enabling the user to enjoy a wide-screen image personally.

Incidentally, a conventional head-mounted display apparatus is arranged as shown in FIG. 16 [see Japanese Patent Application Unexamined Publication (KOKAI) No. 3-188777]. An image displayed on a two-dimensional display device 51, e.g. a liquid-crystal display device, is reflected by a half-mirror 52 disposed in front of a user's eyeball at a tilt angle of 45 degrees. The reflected display image is enlarged by a concave mirror 53 disposed forward of the half-mirror 52, and the enlarged display image is viewed through the half-mirror 52. It should be noted that the two-dimensional display device 51 is disposed near the front focal point of the concave mirror 53.

Assuming that in the optical system shown in FIG. 16, WD is the distance (working distance) between the optical system and the user's eyeball, D is the diameter of the concave mirror 53, and t is the thickness of the optical system, and considering the passing area for principal rays, the following equations hold. It should be noted that D and t are approximately equal to the vertical and horizontal widths (as viewed in the figure), respectively, of the half-mirror 52, which is tilted at 45 degrees; therefore, D and t are approximately equal to each other.

$D=2(t+WD)\tan(\theta/2)$ $t=D$ $t\{1-2\tan(\theta/2)\}=2WD\tan(\theta/2)$ $t=2WD\tan(\theta/2)/\{1-2\tan(\theta/2)\}$ In view of the operability of the head-mounted display apparatus, it is necessary to set WD in the range of from 10 millimeters to 40 millimeters. In a case where WD is 20 millimeters and the field angle θ is 40 degrees, for example, the thickness t of the optical system becomes as large as 53 millimeters as will be understood from the above equations. Moreover, it is necessary in actual practice to ensure a passing area for subordinate rays in addition to the principal rays. Accordingly, a larger optical system is needed.

There is another problem that because a small-sized two-dimensional display device does not have a large number of pixels, the enlarged image of the display device for observation cannot have sufficiently high resolution. Under these circumstances, the present inventor examined a scheme of obtaining a wide image display area by providing a plurality of two-dimensional display devices in a side-by-side relation to each other. However, another problem is associated with this scheme. That is, a lightweight liquid-crystal display device is commonly used in a display apparatus of the type which is fitted to an observer's head as in a head-mounted display apparatus, and the liquid-crystal display device has an image display structure in which, as shown in the front view of FIG. 17, an image display area G is surrounded by a substrate portion K. Therefore, if a plurality of such liquid-crystal display devices are disposed in a side-by-side relation to each other, the substrate portions K of each pair of adjacent display devices interfere with each other, making it difficult to obtain the desired wide image display area.

Attempts have heretofore been made to widen the observation field angle by combining two or more two-dimensional display devices. However, U.S. Pat. No. 5,157,503 and German Pat. No. 4,127,924 are not such compact and lightweight apparatuses as to be fittable to an observer's head. In Japanese Patent Application Unexamined Publication (KOKAI) No. 6-308425, aberrations occur to a considerable extent because an ocular optical system is formed by using a convex lens. Moreover, aberrations change considerably when the observer's eyeball position is shifted from the proper position. Accordingly, a variety of observers having different interpupillary distances cannot stably observe the displayed image.

SUMMARY OF THE INVENTION

In view of the above-described problems associated with the prior art, an object of the present invention is to provide a visual display apparatus suitable for use in a head-mounted display apparatus or the like, which uses two or more two-dimensional display devices and which is compact, lightweight and enables an image which is clear as far as the periphery of the observation image field to be observed at a wide field angle and high resolution.

To attain the above-described object, the present invention provides a visual display apparatus having an ocular optical system that leads an image formed by a two-dimensional display device to an eyeball of an observer to thereby project the image as an enlarged virtual image. The two-dimensional display device has a first two-dimensional display device and a second two-dimensional display device. The ocular optical system includes a first surface having both reflecting and transmitting actions, a second surface having at least reflecting action, and a third surface having at least reflecting action. The first surface is disposed to face the observer's eyeball. The second surface is disposed to face the first surface. The third surface is disposed to face the first surface in a side-by-side relation to the second surface. Thus, images displayed by the first and second two-dimensional display devices are led to the observer's eyeball.

The reasons for adopting the above-described arrangement in the present invention, together with the function thereof, will be explained below. The feature of the present invention resides in that the ocular optical system which projects an enlarged image of the image displayed by the first two-dimensional display device also projects an enlarged image of the image displayed by the second two-dimensional display device. The present invention will be described with reference to FIG. 1. FIG. 1 is a sectional view of an optical system of a visual display apparatus according to Example 1 of the present invention (described later). FIG. 1 shows an optical system designed for a single eye, i.e. a right eye or a left eye. In the figure, reference numeral 1 denotes an observer's iris position; 2 an observer's visual axis; 3 an ocular optical system; 4 a first two-dimensional display device; 5 a second two-dimensional display device: 6 an observer's eyeball; 11 a first surface; 12 a second surface; 13 a third surface; 14 a positive lens for projecting the image of the first two-dimensional display device 4 as an enlarged image; and 15 a positive lens for projecting the image of the second two-dimensional display device 5 as an enlarged image. Coordinate axes in the figure are defined as follows: With the observer's iris position 1 defined as the origin, the observer's visual axis 2 is defined as a Z-axis, where a direction in which the Z-axis extends from the origin toward the ocular optical system 3 is defined as a positive direction of the Z-axis. An axis passing through the observer's iris 1 and perpendicularly intersecting the visual axis 2 is defined as a Y-axis, where a direction in which the Y-axis extends horizontally from the right to the left in the plane of the figure is defined as a positive direction of the Y-axis. An axis passing through the observer's iris 1 and perpendicularly intersecting both the visual axis 2 and the Y-axis is defined as an X-axis, where a direction in which the X-axis extends from the obverse side to the reverse side of the plane of the figure is defined as a positive direction of the X-axis.

In the arrangement shown in FIG. 1, light rays emanating from the first two-dimensional display device 4 travel toward the observer's eyeball 6, pass through the positive lens 14 and enter an optical element constituting the ocular optical system 3 through the third surface 13 having both reflecting and transmitting actions. Then, the rays are reflected by the first surface 11 having both reflecting and transmitting actions to travel away from the observer's eyeball 6. The reflected rays are reflected by the second surface 12 having both reflecting and transmitting actions to travel toward the observer's eyeball 6. Then, the reflected rays pass through the first surface 11 having reflecting and transmitting actions to reach the observer's eyeball 6.

Light rays emanating from the second two-dimensional display device 5 pass through the positive lens 15 and enter the optical element through the second surface 12 having reflecting and transmitting actions. Then, the rays are reflected by the first surface 11 having reflecting and transmitting actions. The reflected rays are reflected by the third surface 13 having reflecting and transmitting actions. Then, the reflected rays pass through the first surface 11 having reflecting and transmitting actions to reach the observer's eyeball 6.

Thus, the images displayed by the two 2-dimensional display devices 4 and 5 are allowed to enter a single ocular optical system and to exit therefrom in approximately the same direction (toward the observer's eyeball position). With this arrangement, the optical system can be constructed in a compact form in comparison to a conventional method in which two 2-dimensional display devices and two optical systems are disposed in a side-by-side relation to each other as in Japanese Patent Application Unexamined Publication (KOKAI) No. 8-327946. In a case where a visual display apparatus is formed by using two optical systems, it is difficult to obtain a continuous image for observation in which two image elements are smoothly joined together because image rays are cut off at the boundary between the two optical systems by optical system retaining members or other members. This problem can be resolved by forming a visual display apparatus using a single optical system. Thus, it is possible to obtain a favorable image for observation in which two image elements are smoothly joined together.

Next, the function of each surface of the ocular optical system 3 will be explained.

First, the first surface 11 having both reflecting and transmitting actions will be explained.

The first surface 11 reflects light emanating from the first two-dimensional display device 4 toward the second surface 12 having both reflecting and transmitting actions. The first surface 11 also reflects light emanating from the second two-dimensional display device 5 toward the third surface 13 having both reflecting and transmitting actions. The first surface 11, which has both reflecting and transmitting actions, is preferably arranged such that reflecting regions thereof which reflect rays from the two 2-dimensional display devices 4 and 5, respectively, overlap each other. By arranging the two reflecting regions to overlap each other, it is possible to dispose large two-dimensional display devices and hence possible to provide the observer with an image of wide field angle.

When the first surface 11 has reflecting action, it is preferable that the first surface 11 should be formed from a single continuous curved surface. It is important for the first surface 11 to be formed from a continuous curved surface because it is possible to observe a nondistorted image even if the reflecting regions for rays from at least two 2-dimensional display devices are disposed to overlap each other.

It is also preferable to form the ocular optical system 3 from a prism optical system (prism member) which has a first surface 11 having both reflecting and transmitting actions and disposed to face the observer's eyeball 6, a second surface 12 having both reflecting and transmitting actions and tilted with respect to the visual axis 2, and a third surface 13 having both reflecting and transmitting actions and tilted with respect to the visual axis 2 in an opposite direction to the second surface 12, and in which the space formed between the first, second and third surfaces 11, 12 and 13 is filled with a medium having a refractive index larger than 1. In this case, when rays pass through the first surface 11 having reflecting and transmitting actions, the rays are bent so that the display field angle is enlarged. Accordingly, it is possible to construct an image display apparatus having a smaller size and a wider field angle.

It is also preferable for the prism optical system to have a refractive index not smaller than 1.45. By forming the ocular optical system 3 from a prism optical system having a refractive index of 1.45 or more, it is possible to attain a compact optical system. It is still more desirable to use a transparent medium having a refractive index not smaller than 1.5. It is preferable that the first surface 11, which has reflecting and transmitting actions, should have a reflection angle which is not smaller than the critical angle. In this case, total reflection takes place at the first surface 11; therefore, the first surface 11 need not be provided with a special coating, e.g. half-mirror coating. Accordingly, there is no reduction in the reflectivity or transmittance at the first surface 11, and a bright image can be projected into the observer's eyeball. Further, since the transmitting and reflecting regions of the first surface 11 can be arranged to overlap each other, the optical system can be constructed in a compact form.

Next, the second and third surfaces 12 and 13, which have both reflecting and transmitting actions, will be explained.

When the second and third surfaces 12 and 13 function as reflecting surfaces, rays from the first and second two-dimensional display devices 4 and 5 which are reflected by the first surface 11 are reflected toward the observer's eyeball 6 by the second and third surfaces 12 and 13, respectively. Accordingly, the images of the first and second two-dimensional display devices 4 and 5 are perceived by the observer as images on the sides opposite to the sides of the observer's visual axis 2 on which the two display devices 4 and 5 are disposed, respectively.

It is desirable to form the second and third surfaces 12 and 13 so that these surfaces have both transmitting and reflecting actions by setting each of the transmittance and reflectivity in the range of from 10% to 90%.

It is more desirable to set each of the transmittance and reflectivity of the second and third surfaces 12 and 13 in the range of from 40% to 50%. In particular, an optical system which is less costly and easy to handle can be constructed by forming the second and third surfaces 12 and 13 using a thin film of a metal, e.g. aluminum or silver.

It is also possible to form surfaces having the above-described actions by using partially reflecting-transmitting surfaces, holographic surfaces, dielectric multilayer films, etc.

It is preferable that the second and third surfaces 12 and 13, which have both reflecting and transmitting actions, should have a positive power. The positive power enables the image of the first two-dimensional display device 4 to be displayed as an enlarged virtual image. By giving a positive power to the second and third surfaces 12 and 13, optical elements of positive power can be disposed closer to the observer's eyeball 6, and it is possible to dispose an optical system having a short focal length. Accordingly, it is possible to construct an ocular optical system 3 of wide field angle.

Further, it is preferable that the second and third surfaces 12 and 13, which have both reflecting and transmitting actions, should be formed from rotationally asymmetric surfaces. The reason for this is that the second surface 12 is tilted with respect to the visual axis 2 lying forward of the observer.

When a rotationally symmetric optical system is decentered, rotationally asymmetric aberrations occur, and it is impossible to correct these aberrations by a rotationally symmetric optical system alone. Rotationally asymmetric aberrations due to decentration include image distortion, curvature of field, and astigmatic and comatic aberrations, which occur even on the axis. FIG. 13 shows curvature of field produced by a decentered concave mirror M. FIG. 14 shows astigmatism produced by a decentered concave mirror M. FIG. 15 shows comatic aberration produced by a decentered concave mirror M. Accordingly to the present invention, a rotationally asymmetric surface is disposed in the optical system to correct such rotationally asymmetric aberrations due to decentration.

Rotationally asymmetric aberrations produced by the decentered concave mirror M include rotationally asymmetric curvature of field. For example, when light rays from an infinitely distant object point are incident on the decentered concave mirror M, the light rays are reflected by the concave mirror M to form an image. In this case, the back focal length from that portion of the concave mirror M on which the light rays strike to the image surface is a half the curvature of the portion on which the light rays strike. Consequently, an image surface tilted with respect to the axial principal ray is formed as shown in FIG. 13.

Thus, it is impossible to correct such rotationally asymmetric curvature of field by a rotationally symmetric optical system. The tilted curvature of field can be corrected by forming the concave mirror M from a rotationally asymmetric surface. In the arrangement shown in FIG. 13, the tilted curvature of field can be corrected by arranging the concave mirror M such that the curvature is made strong (refracting power is increased) in the positive Y-axis direction in the coordinate system shown in the figure (the same is the case with FIGS. 14 and 15), whereas the curvature is made weak (refracting power is reduced) in the negative Y-axis direction. It is also possible to obtain a flat image surface with a minimal number of constituent surfaces by disposing a rotationally asymmetric surface having the same effect as that of the above-described arrangement in the optical system separately from the concave mirror M.

Next, rotationally asymmetric astigmatism will be explained. A decentered concave mirror M produces astigmatism even for axial rays, as shown in FIG. 14, as in the case of the above. The astigmatism can be corrected by appropriately changing the curvatures in the X- and Y-axis directions of the rotationally asymmetric surface as in the case of the above.

Rotationally asymmetric coma will be explained below. A decentered concave mirror M produces coma even for axial rays, as shown in FIG. 15, as in the case of the above. The coma can be corrected by changing the tilt of the rotationally asymmetric surface according as the distance from the origin of the X-axis increases, and further appropriately changing the tilt of the surface according to the sign (positive or negative) of the Y-axis.

A rotationally asymmetric surface (three-dimensional surface) usable in the present invention is defined by the following equation:

$$Z = C_2 + C_3 y + C_4 x + C_5 y^2 + C_6 yx + C_7 x^2 + C_8 y^3 + \quad \text{(a)}$$
$$C_9 y^2 x + C_{10} yx^2 + C_{11} x^3 + C_{12} y^4 + C_{13} y^3 x + C_{14} y^2 x^2 +$$
$$C_{15} yx^3 + C_{16} x^4 + C_{17} y^5 + C_{18} y^4 x + C_{19} y^3 x^2 + C_{20} y^2 x^3 +$$
$$C_{21} yx^4 + C_{22} x^5 + C_{23} y^6 + C_{24} y^5 x + C_{25} y^4 x^2 + C_{26} y^3 x^3 +$$
$$C_{27} y^2 x^4 + C_{28} yx^5 + C_{29} x^6 + C_{30} y^7 + C_{31} y^6 x + C_{32} y^5 x^2 +$$
$$C_{33} y^4 x^3 + C_{34} y^3 x^4 + C_{35} y^2 x^5 + C_{36} yx^6 + C_{37} x^7$$

where $C_m$ (m is an integer of 2 or higher) are coefficients.

It should be noted that curved surfaces defined by any defining equation can be used in the present invention in addition to those defined by the above equation.

Further, it is preferable to form the above-described rotationally asymmetric surface by using a plane-symmetry three-dimensional surface having only one plane of symmetry. By doing so, aberrations can be corrected even more favorably.

It is preferable that the second and third surfaces 12 and 13, which have both reflecting and transmitting actions, should be a plane-symmetry three-dimensional surface which is in plane symmetry with respect to the YZ-plane. A plane-symmetry three-dimensional surface having only one plane of symmetry parallel to the YZ-plane is obtained by making all terms with odd-numbered powers of x zero. For example, in the above defining equation (a), the coefficients of the terms $C_4$, $C_6$, $C_9$. $C_{11}$, $C_{13}$, $C_{15}$, $C_{18}$, $C_{20}$, $C_{22}$, $C_{24}$, $C_{26}$, $C_{28}$, $C_{31}$, $C_{33}$, $C_{35}$, $C_{37}$, . . . are set equal to zero. By doing so, it is possible to obtain a three-dimensional surface having only one plane of symmetry parallel to the YZ-plane.

A plane-symmetry three-dimensional surface having only one plane of symmetry parallel to the XZ-plane is obtained by making all terms with odd-numbered powers of y zero. For example, in the above defining equation (a), the coefficients of the terms $C_3$, $C_6$, $C_8$. $C_{10}$, $C_{13}$, $C_{15}$, $C_{17}$, $C_{19}$, $C_{21}$, $C_{24}$, $C_{26}$, $C_{28}$, $C_{30}$, $C_{32}$, $C_{34}$, $C_{36}$, . . . are set equal to zero. By doing so, it is possible to obtain a three-dimensional surface having only one plane of symmetry parallel to the XZ-plane.

The use of a plane-symmetry three-dimensional surface having such a plane of symmetry makes it possible to improve the productivity.

It should be noted that the above defining equation (a) is shown as merely an example of a rotationally asymmetric three-dimensional surface, and that the feature of the present invention resides in the correction of rotationally asymmetric aberrations due to decentration. Therefore, the same advantageous effect can be obtained for any other defining equations, e.g. a toric surface and an anamorphic surface.

It is preferable to form the first surface 11 by using a surface having two planes of symmetry. In particular, in a case where the projected images of the two 2-dimensional display devices 4 and 5 are made equal in size to each other, only the terms $C_5$, $C_7$, $C_{12}$, $C_{14}$, $C_{16}$, $C_{23}$, $C_{25}$, $C_{27}$ and $C_{29}$ in the above defining equation are used, and the first surface 11 is disposed so as not to tilt with respect to the observer's visual axis 2. Consequently, the first surface 11 becomes symmetric with respect to two planes, i.e. the XZ-plane and the YZ-plane, and the two images of the first and second two-dimensional display devices 4 and 5 have image distortion symmetric in the Y-axis direction about the visual axis 2 and therefore give a minimal sense of incongruity to the observer during observation.

It is preferable that the transverse aberration of rays on the two-dimensional display devices 4 and 5 should be 50 micrometers or less in backward ray tracing from the observer's pupil position 1 toward the two-dimensional display devices 4 and 5. With this arrangement, it becomes possible to view a clear observation image.

It is preferable that the entrance pupil diameter should be 4 millimeters or more in the above-described backward ray tracing. This is important in an ocular optical system that presents an image at a wide observation field angle. The reason for this is that when the observation field angle is wide, the observer rolls his/her eyeball to make observation; therefore, to prevent the observation image from breaking off, it is important for the entrance pupil diameter to be 4 millimeters or more in the case of backward ray tracing of the ocular optical system. It is still more desirable for the entrance pupil diameter to be 10 millimeters or more.

The following description of the operation of the present invention will be made on the basis of backward ray tracing for the convenience of designing the optical system. In the backward ray tracing, the position of the virtual image to be viewed by the observer is defined as an object point, and the observer's pupil position is defined as a stop plane. Further, the display plane of each two-dimensional display device is defined as an image point.

Regarding the first two-dimensional display device, it is assumed that a light ray passing through the center of the object point and passing through the center of the stop to reach the center of the image plane is defined as a first axial principal ray. An axis extending forward of the observer is defined as a visual axis, and a straight line along which the visual axis extends until it intersects the first surface of the optical system is defined as a Z-axis. An axis perpendicularly intersecting the Z-axis in the plane of decentration of each surface constituting the ocular optical system is defined as a Y-axis. An axis perpendicularly intersecting both the Z- and Y-axes is defined as an X-axis.

According to the backward ray tracing, the axial principal ray and a light ray which is parallel to the axial principal ray at a slight distance d in the X-axis direction are made to enter the ocular optical system 3, and the tangent of an angle formed between the two rays when intersecting the image plane is divided by the distance d to determine the power Px in the X-axis direction of the optical system. The reciprocal of the power Px is defined as the focal length fx in the X-axis direction. Similarly, the power Py and focal length fy in the Y-axis direction are defined. From the field angles θx and θy in the X- and Y-axis directions, the ideal image heights Ix and Iy are determined by the following two equations:

$$fx \times \tan\theta x = Ix \qquad (1\text{-}1)$$

$$fy \times \tan\theta y = Iy \qquad (1\text{-}2)$$

Assuming that differences between the actual image heights and the ideal image heights Ix and Iy are image distortions in the X- and Y-axis directions, respectively, it is desirable that each image distortion should be 20% or less. The above defining equations apply in the case of a planar observation image. When the observation image is a sphere centered at the observer's eyeball position, image distortions in the X- and Y-axis directions are obtained by determining differences between the actual image heights and the ideal image heights Ix and Iy defined by the following two equations:

$$fx \times \theta x = Ix \qquad (2\text{-}1)$$

$$fy \times \theta y = Iy \qquad (2\text{-}2)$$

In this case also, it is desirable that each image distortion should be 20% or less.

In either case, if the image distortion exceeds 20%, the two 2-dimensional display devices cannot smoothly be joined together, and it becomes impossible to obtain a continuous observation image.

Further, it is desirable that the second and third surfaces having both reflecting and transmitting actions should intersect each other at a single curved line (as viewed in the YZ-plane, the second and third surfaces intersect at a point, whereas, as viewed in the XZ-plane, the two surfaces intersect at a curved line consisting of a set of contiguous points of intersection), and that the following condition should be satisfied:

$$90° < \alpha < 180° \qquad (3)$$

where α is the angle formed between the two surfaces in the vicinity of the line of intersection (i.e. the angle formed between the two surfaces in the vicinity of the point of intersection as viewed in the YZ-section).

If the angle α is not smaller than the upper limit of the condition (3), i.e. 180°, it becomes impossible to form optical paths such as those in the present invention, and it is impossible to construct an optical system that enlarges the images of two 2-dimensional display devices by itself. If the angle α is not larger than the lower limit, i.e. 90°, rays are repeatedly reflected between the first and second surfaces, and the undesirably reflected rays are observed as ghost, unfavorably.

It is even more desirable to satisfy the following condition:

$$110° < \alpha < 170° \qquad (3)'$$

The meaning of each of the upper limit 170° and lower limit 110° of the condition (3)' is the same as in the condition (3).

It is still more desirable to satisfy the following condition:

$$130° < \alpha < 150° \qquad (3)''$$

The meaning of each of the upper limit 150° and lower limit 130° of the condition (3)″ is the same as in the condition (3).

It is desirable to minimize the image distortion in the vicinity of the joint between the projected images of at least two 2-dimensional display devices, that is, in the vicinity of the visual axis. If the images at the joint are distorted, the two images cannot smoothly be joined together. In particular, when a straight line or a moving object is displayed, it appears to be unnatural.

It is even more desirable that the above-described image distortion should be 15% or less, still more desirably 10% or less.

It is particularly important to minimize the change of image distortion in the Y-axis direction on each two-dimensional display device in the backward ray tracing when the observation field angle in the observer's visual axis direction changes from a negative to a positive on the X-axis. If the image distortion in this portion is large, the images in the visual axis direction on the two display devices are displayed double, and the displayed image appears to be particularly bad.

The change of the image distortion in the Y-axis direction on the two-dimensional display device when the observation field angle changes from a negative to a positive on the X-axis should desirably be 1 millimeter or less, more desirably 0.1 millimeter or less.

It is desirable for the two 2-dimensional display devices to be disposed such that the images of the two display devices are partially superimposed on one another in the visual axis direction as shown in Example 1. By providing the superimposed portion, even when the observer's pupil position is displaced, at least one image can be observed without breaking off.

It is preferable that the angle (field angle) at which rays emanate from each two-dimensional display device should be smaller than a certain value with respect to a line normal to the display device. Among the rays emanating from the two-dimensional display device, those which have a large field angle toward the observer may undesirably exit from the ocular optical system toward the observer by being refracted through the first surface after entering the ocular optical system through the third surface while being refracted thereby. If the rays enter the observer's eyeball, they may be perceived as a flare or ghost image, which has an adverse effect on the image for observation. Therefore, the field angle of rays emanating from the two-dimensional display device is limited to remove the flare or ghost image effectively.

In the ocular optical system according to the present invention, the second and third surfaces, which face the first surface, are desirably disposed in a side-by-side relation to each other in the horizontal direction with respect to the observer. By disposing the second and third surfaces in this way, it is possible to realize an image which is wide (wide-angle image) in the horizontal direction even if small two-dimensional display devices are used. Thus, it is possible to obtain a visual display apparatus capable of displaying an image with an enhanced dynamic presence while holding the apparatus compact in size.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 8 is a diagram showing an example in which the field angle of a two-dimensional display device is limited by a louver optical element in the present invention.

FIGS. 9(*a*) and 9(*b*) are diagrams each showing an example in which the field angle of a two-dimensional display device is limited by an illumination optical system in the present invention.

DESCRIPTION OF THE PREFERRED EMBODIMENTS

Examples 1 to 5 of the visual display apparatus according to the present invention will be described below.

EXAMPLE 1

Figure 1:
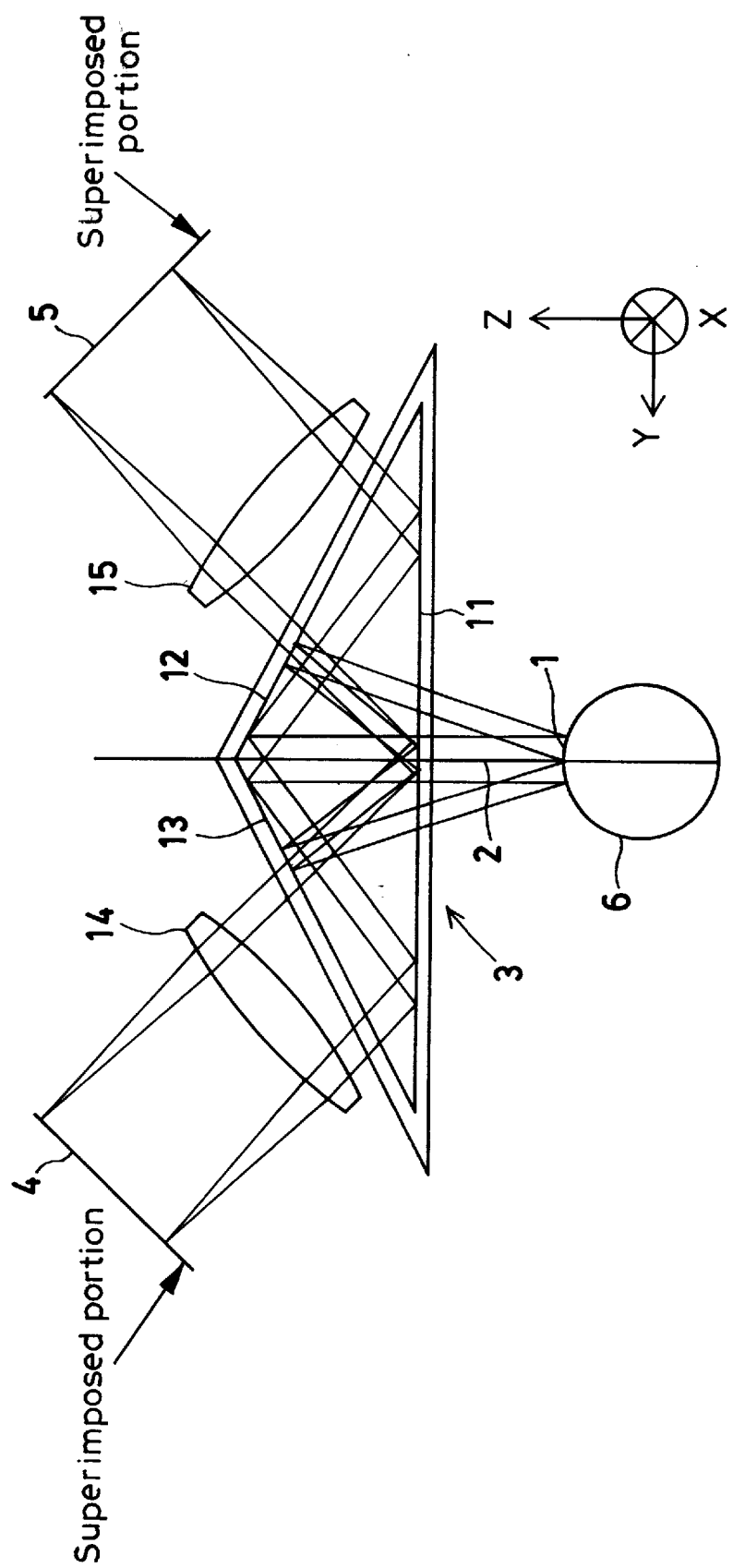
FIG. 1 is a sectional view showing an optical system of a visual display apparatus according to Example 1 of the present invention.

FIG. 1 is a sectional view showing the optical system of a visual display apparatus according to Example 1. The optical system shown in FIG. 1 is designed for a single eye, i.e. the right or left eye of an observer. In the figure, reference numeral 1 denotes an observer's iris position; 2 an observer's visual axis 2; 3 an ocular optical system; 4 a first two-dimensional display device; 5 a second two-dimensional display device; 6 an observer's eyeball; 11 a first surface; 12 a second surface; 13 a third surface; 14 a positive lens for projecting the image of the first two-dimensional display device 4 as an enlarged image; and 15 a positive lens for projecting the image of the second two-dimensional display device 5 as an enlarged image.

In the arrangement shown in FIG. 1, light rays emanating from the first two-dimensional display device 4 travel toward the observer's eyeball 6, pass through the positive lens 14 and enter an optical element constituting the ocular optical system 3 through the third surface 13 having both reflecting and transmitting actions. Then, the rays are reflected by the first surface 11 having both reflecting and transmitting actions to travel away from the observer's eyeball 6. The reflected rays are reflected by the second surface 12 having both reflecting and transmitting actions to travel toward the observer's eyeball 6. Then, the reflected rays pass through the first surface 11 having reflecting and transmitting actions to reach the observer's eyeball 6.

Light rays emanating from the second two-dimensional display device 5 pass through the positive lens 15 and enter the optical element through the second surface 12 having reflecting and transmitting actions. Then, the rays are reflected by the first surface 11 having reflecting and transmitting actions. The reflected rays are reflected by the third surface 13 having reflecting and transmitting actions. Then, the reflected rays pass through the first surface 11 having reflecting and transmitting actions to reach the observer's eyeball 6.

In this example, the ocular optical system 3 is formed from three plane surfaces 11 to 13 having reflecting and transmitting actions. As optical systems for enlarging the images of the two-dimensional display devices 4 and 5, transmission positive lenses 14 and 15 are used. The three surfaces 11, 12 and 13 are formed as surface-coated mirrors.

It is desirable to set the transmittance and reflectivity of the second and third surfaces 12 and 13 in the range of from 10% to 90%. By doing so, a bright observation image can be obtained. It is even more desirable to set the transmittance and reflectivity of the second and third surfaces 12 and 13 in the range of from 40% to 50%.

It is desirable from the viewpoint of simplifying the arrangement that the second and third surfaces 12 and 13 should be disposed in symmetry with respect to the visual axis 2. In particular, when the surfaces 11 to 13 are combined together after being produced separately from each other, it is preferable to dispose the second and third surfaces 12 and 13 in symmetry with respect to the visual axis 2.

In this example, the angle α formed between the second surface 12 and the third surface 13 is $$\alpha = 123°$$

EXAMPLE 2

Figure 2:
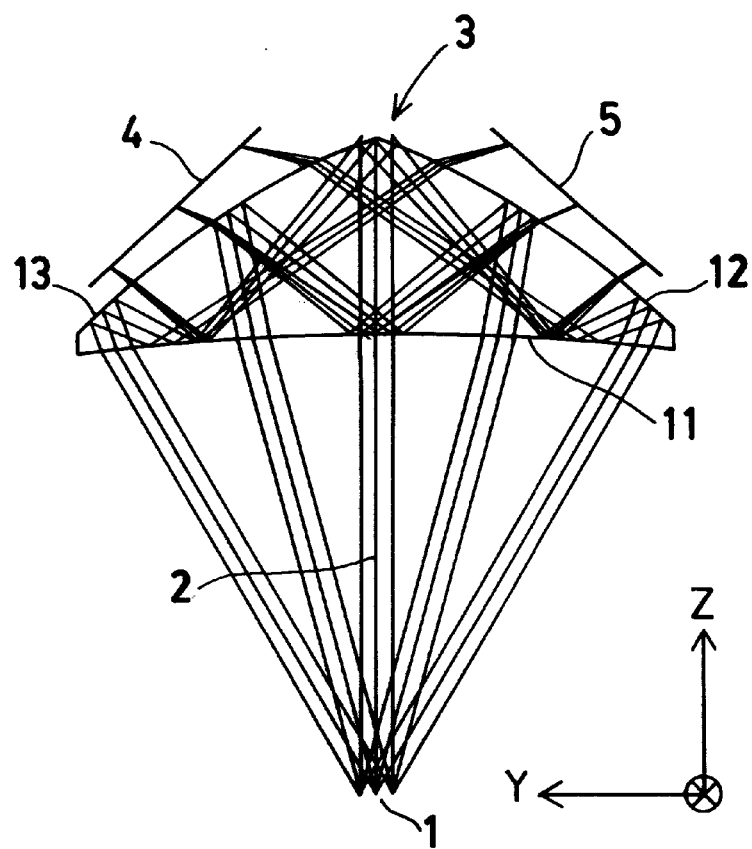
FIG. 2 is a sectional view showing an optical system of a visual display apparatus according to Example 2 of the present invention.

FIG. 2 is a sectional view showing the optical system of a visual display apparatus according to Example 2. In the arrangement shown in FIG. 2, light rays emanating from a first two-dimensional display device 4 travel toward a pupil 1 of a prism optical system constituting an ocular optical system 3, and enter the prism optical system 3 through a third surface 13 of the prism optical system 3 which has both reflecting and transmitting actions. Then, the rays are reflected by a first surface 11 of the prism optical system 3 which has both reflecting and transmitting actions to travel away from the pupil 1. The reflected rays are reflected by a second surface 12 of the prism optical system 3 which has both reflecting and transmitting actions to travel toward the pupil 1. Then, the reflected rays exit from the prism optical system 3 through the first surface 11 having reflecting and transmitting actions to reach the pupil 1.

Light rays emanating from a second two-dimensional display device 5 travel toward the pupil 1 and enter the prism optical system 3 through the second surface 12 thereof which has both reflecting and transmitting actions. Then, the rays are reflected by the first surface 11 having reflecting and transmitting actions to travel away from the pupil 1. The reflected rays are reflected by the third surface 13 having reflecting and transmitting actions to travel toward the pupil 1. Then, the reflected rays exit from the prism optical system 3 through the first surface 11 having reflecting and transmitting actions to reach the pupil 1.

All the first, second and third surfaces 11, 12 and 13 of the prism optical system 3 are formed from three-dimensional surfaces. The first surface 11 is symmetric with respect to both the XZ- and YZ-planes. The second and third surfaces 12 and 13 are each symmetric with respect to the YZ-plane. The second and third surfaces 12 and 13 have surface configurations symmetric with each other with respect to the XZ-plane. Moreover, the first and second two-dimensional display devices 4 and 5 are disposed in symmetry with each other with respect to the XZ-plane. Accordingly, the prism optical system 3 is symmetric with respect to both the XZ- and YZ-planes.

Constituent parameters in the backward ray tracing of this example and the following Examples 3 to 5 will be shown later. In the constituent parameters, as shown in FIG. 2, the pupil position 1 is defined as the origin. The observer's visual axis 2 is defined as a Z-axis, where a direction in which the Z-axis extends from the origin toward the prism optical system 3 is defined as a positive direction of the Z-axis. An axis passing through the pupil position 1 and perpendicularly intersecting the visual axis 2 in a plane in which an axial principal ray traveling along the visual axis 2 is bent by the prism optical system 3 is defined as a Y-axis, where a direction in which the Y-axis extends horizontally from the right to the left in the plane of the figure is defined as a positive direction of the Y-axis. An axis passing through the pupil position 1 and perpendicularly intersecting both the visual axis 2 and the Y-axis is defined as an X-axis, where a direction in which the X-axis extends from the obverse side to the reverse side of the plane of the figure is defined as a positive direction of the X-axis. It should be noted that ray tracing is carried out by backward ray tracing from the pupil 1 of the prism optical system 3 toward the prism optical system 3.

Regarding decentered surfaces, each surface is given displacements in the X-, Y- and Z-axis directions of the vertex position of the surface from the center of the pupil 1, which is the origin of the optical system 3, and tilt angles of the center axis of the surface [the Z-axis of the above equation (a) with respect to rotationally asymmetric surfaces; the Z-axis of the following equation (b) with respect to anamorphic surfaces] with respect to the X-, Y- and Z-axes (α, β, and γ, respectively). In this case, positive α and β mean counterclockwise rotation relative to the positive directions of the corresponding axes, and positive γ means clockwise rotation relative to the positive direction of the Z-axis. In addition, the radius of curvature of each surface, surface separation, refractive index of each medium, and Abbe's number are given according to the conventional method.

The configuration of a rotationally asymmetric surface (three-dimensional surface) is defined by the above equation (a). The Z-axis of the defining equation is the axis of the rotationally asymmetric surface.

The configuration of an anamorphic surface is defined by the following equation. A straight light that passes through the origin of the surface configuration and that is perpendicular to the optical surface is the axis of the anamorphic surface.

$$Z = \\ (C_x \cdot X^2 + C_y \cdot Y^2)/\left[1 + \{1 - (1+K_x)C_x^2 \cdot X^2 - (1+K_y)C_y^2 \cdot Y^2\}^{1/2}\right] + \\ AR\{(1-AP)X^2 + (1+AP)Y^2\}^2 + BR\{(1-BP)X^2 + (1+BP)Y^2\}^3 + \\ CR\{(1-CP)X^2 + (1+CP)Y^2\}^4 + DR\{(1-DP)X^2 + (1+DP)Y^2\}^5$$ (b)

where Z is the amount of deviation from a plane tangent to the origin of the surface configuration; $C_x$ is the curvature in the X-axis direction; $C_y$ is the curvature in the Y-axis direction; $K_x$ is the conical coefficient in the X-axis direction; $K_y$ is the conical coefficient in the Y-axis direction; AR, BR, CR and DR are 4th-, 6th-, 8th- and 10th-order aspherical coefficients, respectively, which are rotationally symmetric with respect to the Z-axis; and AP, BP, CP and DP are 4th-, 6th-, 8th- and 10th-order aspherical coefficients, respectively, which are rotationally asymmetric with respect to the Z-axis. It should be noted that the radius of curvature Rx in the X-axis direction and the radius of curvature Ry in the Y-axis direction are related to the curvatures $C_x$ and $C_y$ as follows:

$$R_x = 1/C_x, R_y = 1/C_y$$

In the constituent parameters (shown later), coefficients concerning aspherical surfaces for which no data is shown are zero.

It should be noted that as image plane position data, only position data concerning the first two-dimensional display device 4 is shown in the constituent parameters. The second two-dimensional display device 5 is disposed in symmetry with the first two-dimensional display device 4 with respect to the XZ-plane (the same is the case with Examples 3 to 5).

In Example 2, the entrance pupil (as viewed in the backward ray tracing, the pupil 1 is the entrance pupil; as viewed in the forward ray tracing; the pupil 1 is the exit pupil) has a diameter of 4 millimeters. The field angle for one two-dimensional display device is 30 degrees. The focal length in the X-direction is 35.398 millimeters, and the focal length in the Y-direction is 35.189 millimeters.

In this example, the angle α formed between the second and third surfaces 12 and 13 in the vicinity of the intersection point as viewed in the YZ-section is

α=139°

EXAMPLE 3

Figure 3:
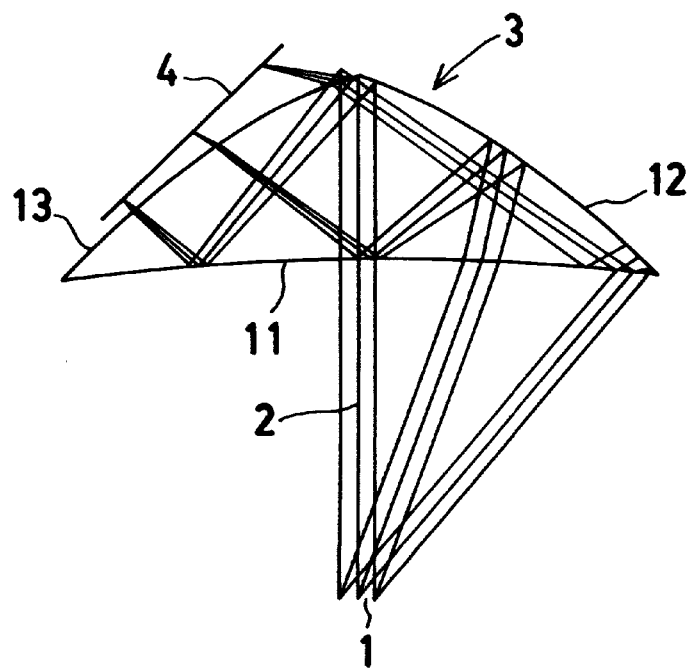
FIG. 3 is a sectional view showing an optical system of a visual display apparatus according to Example 3 of the present invention.

FIG. 3 is a sectional view showing the optical system of a visual display apparatus according to Example 3. A second two-dimensional display device 5 is disposed in symmetry with a first two-dimensional display device 4 with respect to the XZ-plane; therefore, illustration of the second two-dimensional display device 5 is omitted in the figure. The arrangement and operation of Example 3 are the same as those of Example 2; therefore, a description thereof is omitted. The constituent parameters are shown later.

In this example, the entrance pupil diameter is 4 millimeters. The field angle for one two-dimensional display device is 40 degrees. The focal length in the X-direction is 28.474 millimeters, and the focal length in the Y-direction is 27.427 millimeters.

In this example, the angle α formed between the second and third surfaces 12 and 13 in the vicinity of the intersection point as viewed in the YZ-section is

α=140°

EXAMPLE 4

Figure 4:
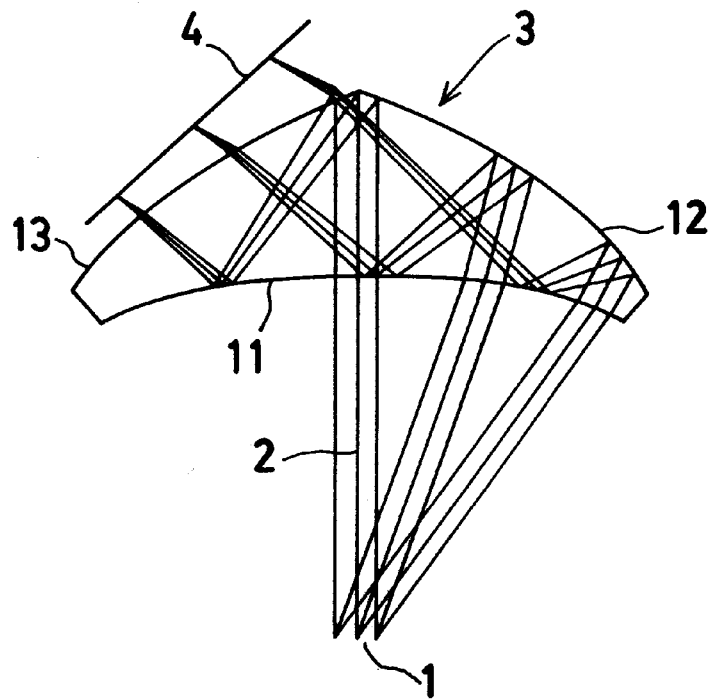
FIG. 4 is a sectional view showing an optical system of a visual display apparatus according to Example 4 of the present invention.

FIG. 4 is a sectional view showing the optical system of a visual display apparatus according to Example 4. A second two-dimensional display device 5 is disposed in symmetry with a first two-dimensional display device 4 with respect to the XZ-plane; therefore, illustration of the second two-dimensional display device 5 is omitted in the figure. The arrangement and operation of Example 4 are the same as those of Example 2; therefore, a description thereof is omitted. The constituent parameters are shown later.

In this example, the entrance pupil diameter is 4 millimeters. The field angle for one two-dimensional display device is 35 degrees. The focal length in the X-direction is 28.258 millimeters, and the focal length in the Y-direction is 34.254 millimeters.

In this example, the angle α formed between the second and third surfaces 12 and 13 in the vicinity of the intersection point as viewed in the YZ-section is

α=145°

EXAMPLE 5

Figure 5:
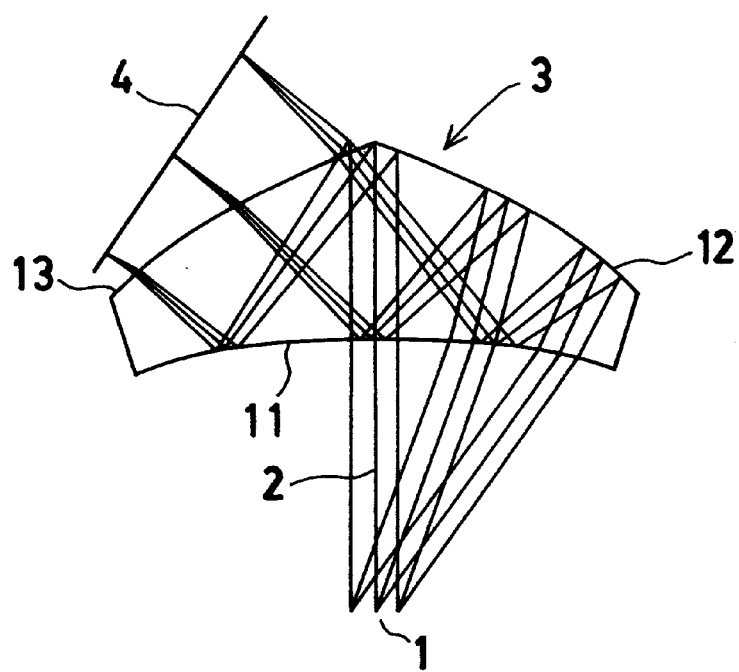
FIG. 5 is a sectional view showing an optical system of a visual display apparatus according to Example 5 of the present invention.

FIG. 5 is a sectional view showing the optical system of a visual display apparatus according to Example 5. A second two-dimensional display device 5 is disposed in symmetry with a first two-dimensional display device 4 with respect to the XZ-plane; therefore, illustration of the second two-dimensional display device 5 is omitted in the figure. In this example, a first surface 11, second surface 12 and third surface 13 of a prism optical system 3 are all formed from anamorphic surfaces. The first surface 11 is symmetric with respect to both the XZ- and YZ-planes. The second and third surfaces 12 and 13 have the same configuration and are symmetric with respect to the YZ-plane. The second and third surfaces 12 and 13 are disposed in symmetry with each other with respect to the XZ-plane. Moreover, the first two-dimensional display device 4 and the second two-dimensional display device 5 are disposed in symmetry with each other with respect to the XZ-plane. Accordingly, the prism optical system 3 is arranged to be symmetric with respect to both the XZ- and YZ-planes. The operation of Example 5 is the same as that of Example 2; therefore, a description thereof is omitted. The constituent parameters are shown later.

In this example, the entrance pupil diameter is 4 millimeters. The field angle for one two-dimensional display device is 35 degrees. The focal length in the X-direction is 28.2627 millimeters, and the focal length in the Y-direction is 25.5085 millimeters.

In this example, the angle α formed between the second and third surfaces 12 and 13 in the vicinity of the intersection point as viewed in the YZ-section is

α=145.2°

The constituent parameters in Examples 2 to 5 are as follows:

Example 2

| Surface No. | Radius of curvature | Surface separation | Displacement and tilt | Refractive index | Abbe's No. |
|---|---|---|---|---|---|
| Object plane | ∞ | −1000.0000 | | | |
| 1 | ∞ | | | | |
| 2 | Three-dimensional surface(1) | | (1) | 1.5254 | 56.2 |
| 3 | Three-dimensional surface(2) | | (2) | 1.5254 | 56.2 |
| 4 | Three-dimensional surface(1) | | (1) | 1.5254 | 56.2 |
| 5 | Three-dimensional surface(3) | | (3) | | |
| Image plane | ∞ | | (4) | | |

Three-dimensional surface(1)

| | | | | | |
|---|---|---|---|---|---|
| $C_5$ | $-1.5780 \times 10^{-3}$ | $C_7$ | $-4.3976 \times 10^{-3}$ | $C_{12}$ | $-1.0394 \times 10^{-7}$ |
| $C_{14}$ | $4.0727 \times 10^{-7}$ | $C_{16}$ | $-2.6531 \times 10^{-6}$ | $C_{23}$ | $8.4543 \times 10^{-12}$ |
| $C_{25}$ | $-1.6274 \times 10^{-10}$ | $C_{29}$ | $9.0697 \times 10^{-9}$ | | |

Three-dimensional surface(2)

| | | | | | |
|---|---|---|---|---|---|
| $C_5$ | $-5.0759 \times 10^{-3}$ | $C_7$ | $-6.1408 \times 10^{-3}$ | $C_8$ | $-1.4433 \times 10^{-5}$ |
| $C_{10}$ | $7.4611 \times 10^{-7}$ | $C_{12}$ | $-4.1403 \times 10^{-7}$ | $C_{14}$ | $-4.4311 \times 10^{-7}$ |
| $C_{16}$ | $-2.6319 \times 10^{-7}$ | | | | |

Three-dimensional surface(3)

| | | | | | |
|---|---|---|---|---|---|
| $C_5$ | $-5.0759 \times 10^{-3}$ | $C_7$ | $-6.1408 \times 10^{-3}$ | $C_8$ | $1.4433 \times 10^{-5}$ |
| $C_{10}$ | $-7.4611 \times 10^{-7}$ | $C_{12}$ | $-4.1403 \times 10^{-7}$ | $C_{14}$ | $-4.4311 \times 10^{-7}$ |
| $C_{16}$ | $-2.6319 \times 10^{-7}$ | | | | |

Displacement and tilt(1)

| x | 0.000 | y | 0.000 | z | 56.966 |
|---|---|---|---|---|---|
| α | 0.00 | β | 0.00 | γ | 0.00 |

Displacement and tilt(2)

| x | 0.000 | y | 0.000 | z | 81.061 |
|---|---|---|---|---|---|
| α | −20.52 | β | 0.00 | γ | 0.00 |

Displacement and tilt(3)

| x | 0.000 | y | 0.000 | z | 81.061 |
|---|---|---|---|---|---|
| α | 20.52 | β | 0.00 | γ | 0.00 |

Displacement and tilt(4)

| x | 0.000 | y | 24.805 | z | 72.634 |
|---|---|---|---|---|---|
| α | 41.85 | β | 0.00 | γ | 0.00 |

Example 3

| Surface No. | Radius of curvature | Surface separation | Displacement and tilt | Refractive index | Abbe's No. |
|---|---|---|---|---|---|
| Object plane | ∞ | −1000.0000 | | | |
| 1 | ∞ | | | | |
| 2 | Three-dimensional surface(1) | | (1) | 1.5254 | 56.2 |
| 3 | Three-dimensional surface(2) | | (2) | 1.5254 | 56.2 |
| 4 | Three-dimensional surface(1) | | (1) | 1.5254 | 56.2 |
| 5 | Three-dimensional surface(3) | | (3) | | |
| Image plane | ∞ | | (4) | | |

Three-dimensional surface(1)

| | | | | | |
|---|---|---|---|---|---|
| $C_5$ | $-1.6334 \times 10^{-3}$ | $C_7$ | $-3.9301 \times 10^{-3}$ | $C_{12}$ | $2.3996 \times 10^{-7}$ |
| $C_{14}$ | $2.8144 \times 10^{-7}$ | $C_{16}$ | $5.3494 \times 10^{-6}$ | $C_{23}$ | $-1.2910 \times 10^{-10}$ |
| $C_{25}$ | $-3.1191 \times 10^{-10}$ | $C_{29}$ | $2.1773 \times 10^{-8}$ | | |

Three-dimensional surface(2)

| | | | | | |
|---|---|---|---|---|---|
| $C_5$ | $-6.1383 \times 10^{-3}$ | $C_7$ | $-7.2327 \times 10^{-3}$ | $C_8$ | $-1.0920 \times 10^{-5}$ |
| $C_{10}$ | $2.4744 \times 10^{-6}$ | $C_{12}$ | $-3.9731 \times 10^{-7}$ | $C_{14}$ | $-3.6328 \times 10^{-7}$ |
| $C_{16}$ | $-4.2872 \times 10^{-7}$ | | | | |

Three-dimensional surface(3)

| | | | | | |
|---|---|---|---|---|---|
| $C_5$ | $-6.1383 \times 10^{-3}$ | $C_7$ | $-7.2327 \times 10^{-3}$ | $C_8$ | $1.0920 \times 10^{-5}$ |
| $C_{10}$ | $-2.4744 \times 10^{-6}$ | $C_{12}$ | $-3.9731 \times 10^{-7}$ | $C_{14}$ | $-3.6328 \times 10^{-7}$ |
| $C_{16}$ | $-4.2872 \times 10^{-7}$ | | | | |

Displacement and tilt(1)

| x | 0.000 | y | 0.000 | z | 37.683 |
|---|---|---|---|---|---|
| α | 0.00 | β | 0.00 | γ | 0.00 |

Displacement and tilt(2)

| x | 0.000 | y | 0.000 | z | 58.416 |
|---|---|---|---|---|---|
| α | −20.16 | β | 0.00 | γ | 0.00 |

Displacement and tilt(3)

| x | 0.000 | y | 0.000 | z | 58.416 |
|---|---|---|---|---|---|
| α | 20.16 | β | 0.00 | γ | 0.00 |

Displacement and tilt(4)

| x | 0.000 | y | 18.638 | z | 52.248 |
|---|---|---|---|---|---|
| α | 42.66 | β | 0.00 | γ | 0.00 |

Example 4

| Surface No. | Radius of curvature | Surface separation | Displacement and tilt | Refractive index | Abbe's No. |
|---|---|---|---|---|---|
| Object plane | ∞ | −2000.0000 | | | |
| 1 | ∞ | | | | |
| 2 | Three-dinensional surface(1) | | (1) | 1.4922 | 57.5 |
| 3 | Three-dimensional surface(2) | | (2) | 1.4922 | 57.5 |
| 4 | Three-dimensional surface(1) | | (1) | 1.4922 | 57.5 |
| 5 | Three-dimensional surface(3) | | (3) | | |
| Image plane | ∞ | | (4) | | |

Three-dimensional surface(1)

| | | | | | |
|---|---|---|---|---|---|
| $C_5$ | $-3.3310 \times 10^{-3}$ | $C_7$ | $-5.4940 \times 10^{-3}$ | $C_{12}$ | $-3.4163 \times 10^{-6}$ |
| $C_{14}$ | $4.7405 \times 10^{-6}$ | $C_{16}$ | $1.9587 \times 10^{-6}$ | $C_{23}$ | $-2.2629 \times 10^{-9}$ |
| $C_{25}$ | $-2.84.66 \times 10^{-8}$ | $C_{27}$ | $-1.9818 \times 10^{-8}$ | $C_{29}$ | $2.1231 \times 10^{-8}$ |

Three-dimensional surface(2)

| | | | | | |
|---|---|---|---|---|---|
| $C_5$ | $-1.5786 \times 10^{-2}$ | $C_7$ | $-9.2558 \times 10^{-3}$ | $C_8$ | $3.4320 \times 10^{-4}$ |
| $C_{10}$ | $2.1241 \times 10^{-4}$ | $C_{12}$ | $-7.3652 \times 10^{-6}$ | $C_{14}$ | $-1.6642 \times 10^{-5}$ |
| $C_{16}$ | $-6.2561 \times 10^{-9}$ | $C_{17}$ | $2.6297 \times 10^{-8}$ | $C_{19}$ | $4.7475 \times 10^{-7}$ |
| $C_{21}$ | $1.5794 \times 10^{-8}$ | $C_{23}$ | $3.5250 \times 10^{-10}$ | $C_{25}$ | $-5.8163 \times 10^{-9}$ |
| $C_{27}$ | $-6.6077 \times 10^{-10}$ | $C_{29}$ | $1.9678 \times 10^{-9}$ | | |

Three-dimensional surface(3)

| | | | | | |
|---|---|---|---|---|---|
| $C_5$ | $-1.5786 \times 10^{-2}$ | $C_7$ | $-9.2558 \times 10^{-3}$ | $C_8$ | $-3.4320 \times 10^{-4}$ |
| $C_{10}$ | $-2.1241 \times 10^{-4}$ | $C_{12}$ | $-7.3652 \times 10^{-6}$ | $C_{14}$ | $-1.6642 \times 10^{-5}$ |
| $C_{16}$ | $-6.2561 \times 10^{-9}$ | $C_{17}$ | $-2.6297 \times 10^{-8}$ | $C_{19}$ | $-4.7475 \times 10^{-7}$ |
| $C_{21}$ | $1.5794 \times 10^{-8}$ | $C_{23}$ | $3.5250 \times 10^{-10}$ | $C_{25}$ | $-5.8163 \times 10^{-9}$ |
| $C_{27}$ | $-6.6077 \times 10^{-10}$ | $C_{29}$ | $1.9678 \times 10^{-9}$ | | |

Displacement and tilt(1)

| x | 0.000 | y | 0.000 | z | 36.337 |
|---|---|---|---|---|---|
| α | 0.00 | β | 0.00 | γ | 0.00 |

Displacement and tilt(2)

| x | 0.000 | y | −26.130 | z | 38.111 |
|---|---|---|---|---|---|
| α | −50.14 | β | 0.00 | γ | 0.00 |

Displacement and tilt(3)

| x | 0.000 | y | 26.130 | z | 38.111 |
|---|---|---|---|---|---|
| α | 50.14 | β | 0.00 | γ | 0.00 |

Displacement and tilt(4)

| x | 0.000 | y | 15.604 | z | 51.991 |
|---|---|---|---|---|---|
| α | 41.99 | β | 0.00 | γ | 0.00 |

Example 5

| Surface No. | Radius of curvature | Surface separation | Displacement and tilt | Refractive index | Abbe's No. |
|---|---|---|---|---|---|
| Object plane | ∞ | −2000.0000 | | | |
| 2 | Anamorphic surface(1) | | (1) | 1.4922 | 57.5 |
| 3 | Anamorphic surface(2) | | (2) | 1.4922 | 57.5 |
| 4 | Anamorphic surface(1) | | (1) | 1.4922 | 57.5 |
| 5 | Anamorphic surface(3) | | (3) | | |
| Image plane | ∞ | | (4) | | |

-continued

| | Anamorphic surface(1) | |
|---|---|---|
| $R_y$ | −71.054 | |
| $R_x$ | −59.375 | |
| $K_y$ | −8.6396 | |
| $K_x$ | 4.2813 | |
| AR | $1.4884 \times 10^{-6}$ | |
| BR | $-7.3904 \times 10^{-16}$ | |
| CR | $1.0896 \times 10^{-12}$ | |
| DR | $-9.1458 \times 10^{-16}$ | |
| AP | $5.7851 \times 10^{-1}$ | |
| BP | $-1.8828 \times 10^{+1}$ | |
| CP | −2.2964 | |
| DP | 1.3541 | |
| | Anamorphic surface(2) | |
| $R_y$ | −57.281 | |
| $R_x$ | −55.277 | |
| $K_y$ | −2.2589 | |
| $K_x$ | 1.6875 | |
| AR | $2.3717 \times 10^{-9}$ | |
| BR | $9.2341 \times 10^{-10}$ | |
| CR | $-1.4324 \times 10^{-13}$ | |
| DR | $-3.8663 \times 10^{-16}$ | |
| AP | 8.7470 | |
| BP | $-3.6876 \times 10^{-1}$ | |
| CP | 1.1859 | |
| DP | 1.4252 | |
| | Anamorphic surface(3) | |
| $R_y$ | −57.281 | |
| $R_x$ | −55.277 | |
| $K_y$ | −2.2589 | |
| $K_x$ | 1.6875 | |
| AR | $2.3717 \times 10^{-9}$ | |
| BR | $9.2341 \times 10^{-10}$ | |
| CR | $-1.4324 \times 10^{-13}$ | |
| DR | $-3.8663 \times 10^{-16}$ | |
| AP | 8.7470 | |
| BP | $-3.6876 \times 10^{-1}$ | |
| CP | 1.1859 | |
| DP | 1.4252 | |

| | | Displacement and tilt(1) | | | |
|---|---|---|---|---|---|
| x | 0.000 | y | 0.000 | z | 23.562 |
| α | 0.00 | β | 0.00 | γ | 0.00 |

| | | Displacement and tilt(2) | | | |
|---|---|---|---|---|---|
| x | 0.000 | y | −9.843 | z | 36.411 |
| α | −27.65 | β | 0.00 | γ | 0.00 |

| | | Displacement and tilt(3) | | | |
|---|---|---|---|---|---|
| x | 0.000 | y | 9.843 | z | 36.411 |
| α | 27.65 | β | 0.00 | γ | 0.00 |

| | | Displacement and tilt(4) | | | |
|---|---|---|---|---|---|
| x | 0.000 | y | 15.604 | z | 51.991 |
| α | 41.99 | β | 0.00 | γ | 0.00 |

Figure 6A:
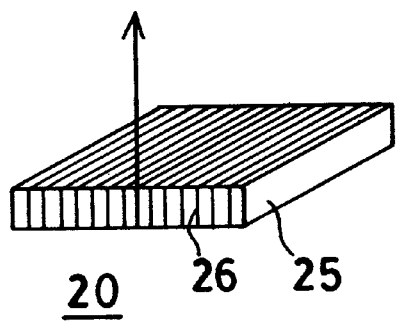
FIGS. 6(*a*) and 6(*b*) are diagrams for describing the arrangements and operations of louver optical elements as field angle limiting devices.
Figure 6B:
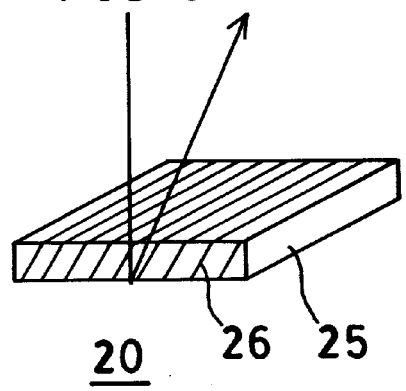
Figure 7A:
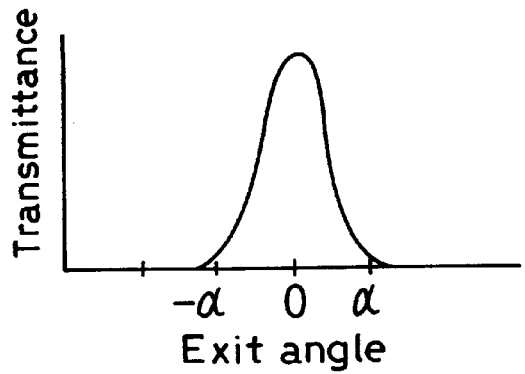
FIGS. 7(*a*) and 7(*b*) are graphs showing the transmittance distributions of the louver optical elements shown in FIGS. 6(*a*) and 6(*b*).
Figure 7B:
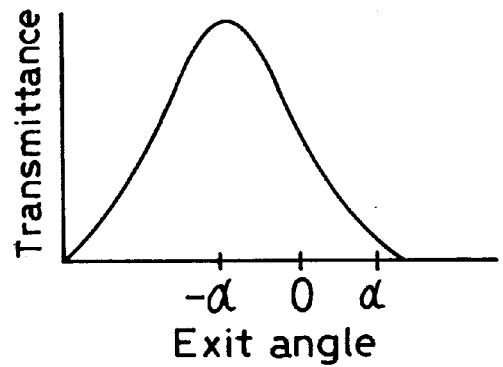

The following is a description of a field angle limiting device for limiting the field angle of each of the two-dimensional display devices 4 and 5 in the visual display apparatus according to the present invention, arranged as described above. FIGS. 6(a) and 6(b) each show one example of a louver optical element 20 usable as a field angle limiting device. The illustrated louver optical element comprises a transparent film 25 having small light-blocking walls 26 which are periodically put therein. By changing the angle of the light-blocking walls 26 to the film surface, the largest incident angle of transmitted light can be changed. FIGS. 7(a) and 7(b) show the transmittance distributions of the louver optical elements 20 shown in FIGS. 6(a) and 6(b), respectively. By inserting such a louver optical element between a two-dimensional display device such as an LCD and a backlight, the field angle of the two-dimensional display device can be limited. FIG. 8 shows an example of such an arrangement. Although in the figure the arrangement for only the first two-dimensional display device 4 is illustrated, it should be noted that the second two-dimensional display device 5 is also provided in a similar arrangement when the visual display apparatus according to the present invention is constructed. In FIG. 8, a ray emanating from the two-dimensional display device 4 and passing through the third surface 13 and the first surface 11 to reach the observer's eyeball 6 is shown by the dotted line. By inserting a louver optical element 20 between the two-dimensional display device 4 and a backlight 21, the field angle is limited, so that the light ray shown by the dotted line does not emanate from the two-dimensional display device 4.

FIGS. 9(a) and 9(b) each show an example in which the field angle is limited by an illumination optical system that illuminates the two-dimensional display device 4. In either case, a reflecting mirror 22 is used to project an image of a light source 23 approximately at infinity. Consequently, light rays passing through the two-dimensional display device 4 become approximately parallel rays. Accordingly, rays emanating obliquely, which are unwanted, are limited, and there are no rays such as those shown by the dotted lines in the figures. Although in this example a reflecting mirror is used, it should be noted that an optical element used to limit the field angle is not necessarily limited to a reflecting mirror, and that the same effect can be obtained by using a positive lens, a light guide, etc.

Figure 10:
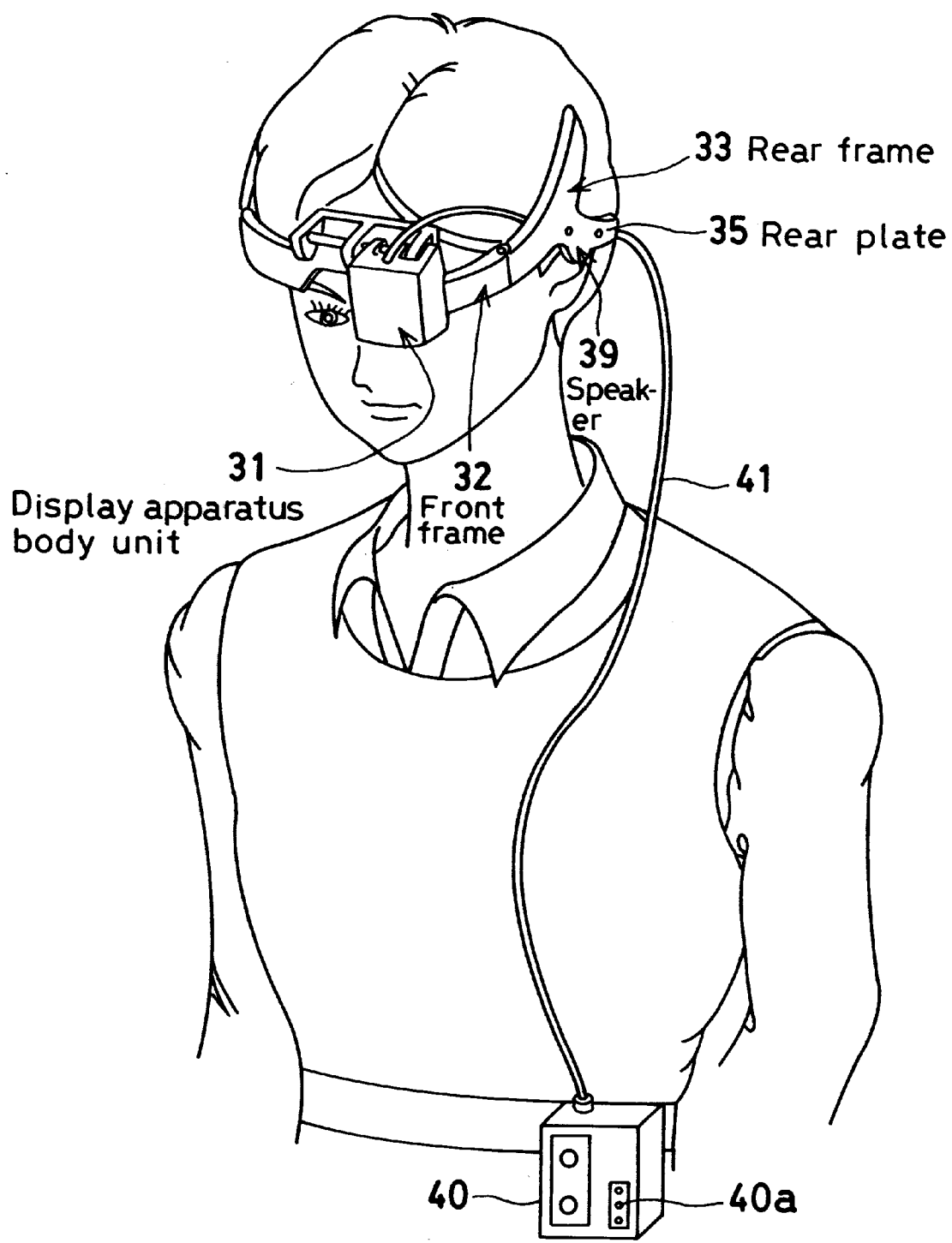
FIG. 10 is a diagram showing a visual display apparatus according to the present invention which is arranged in the form of a visual display apparatus for a single eye.
Figure 11:
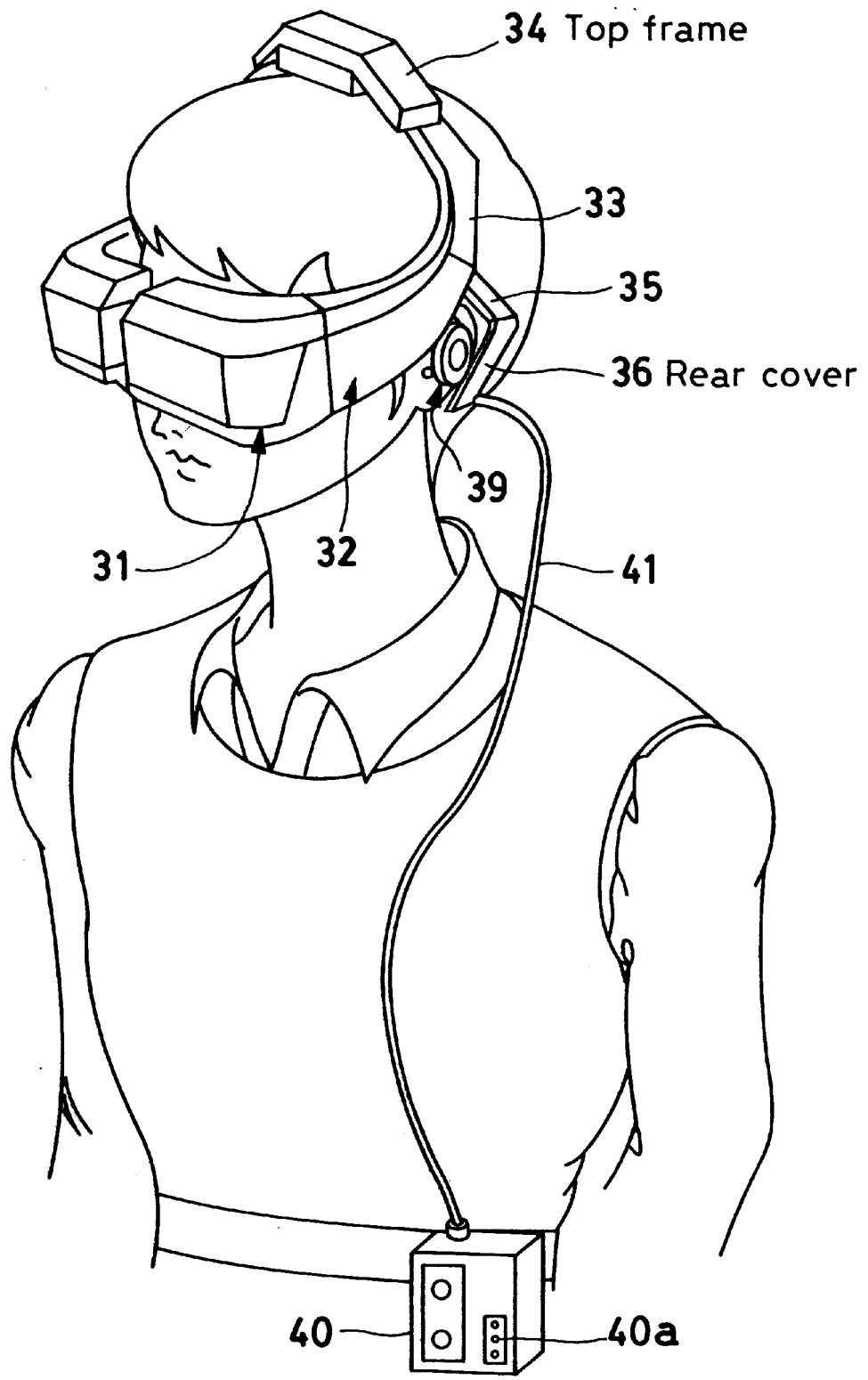
FIG. 11 is a diagram showing a visual display apparatus according to the present invention which is arranged in the form of a visual display apparatus for both eyes.
Figure 12:
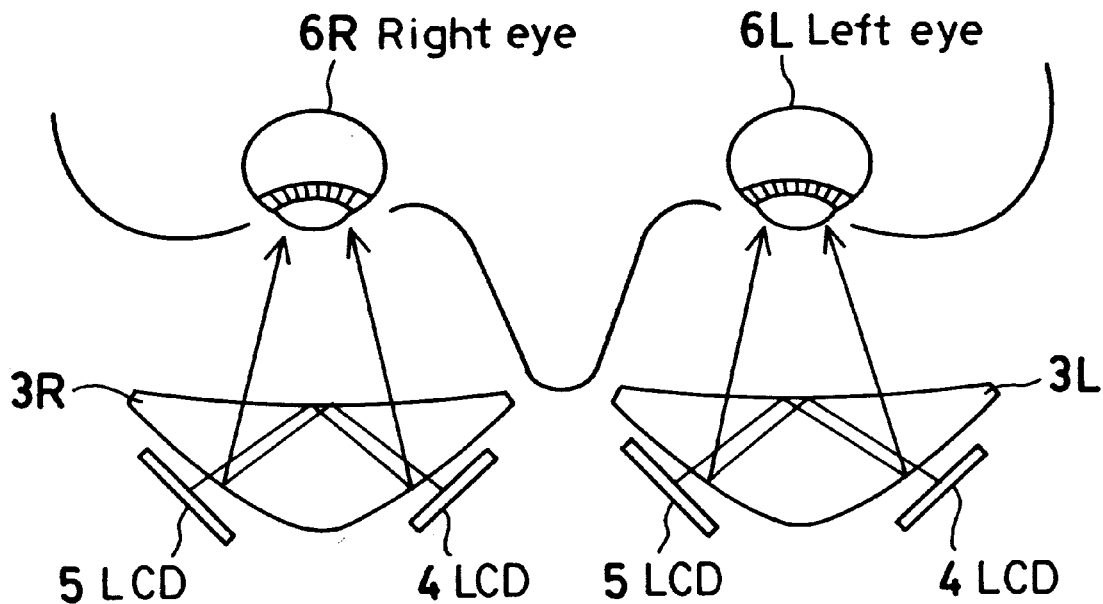
FIG. 12 is a top plan view showing the arrangements of left and right ocular optical systems for the left and right eyes of an observer in the case of the visual display apparatus shown in FIG. 11.
Figure 13:
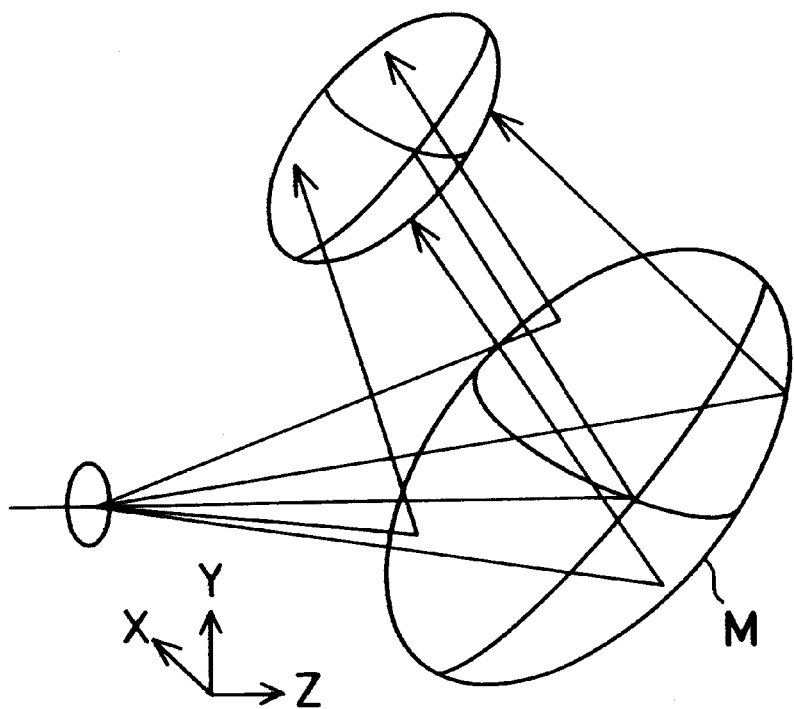
FIG. 13 is a diagram for describing curvature of field produced by a decentered concave mirror.
Figure 14:
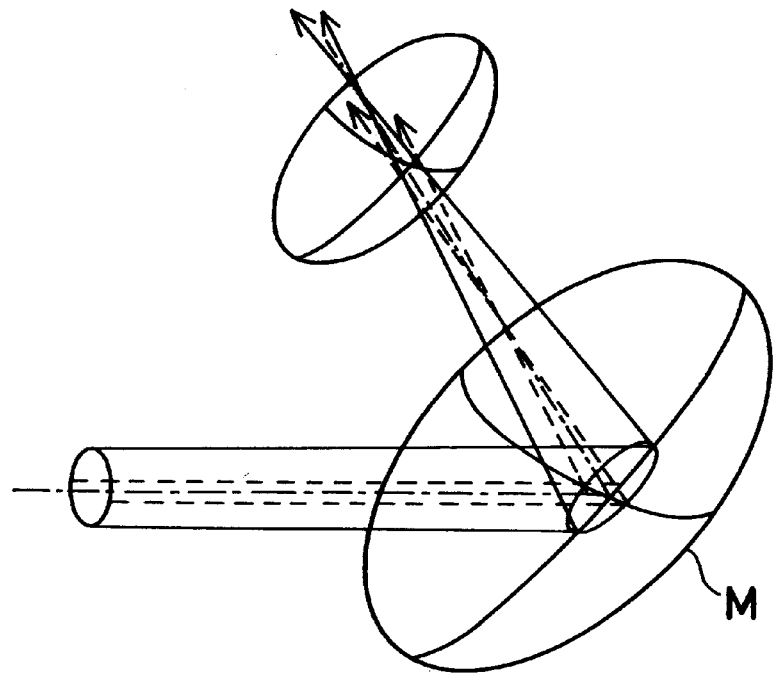
FIG. 14 is a diagram for describing astigmatism produced by a decentered concave mirror.
Figure 15:
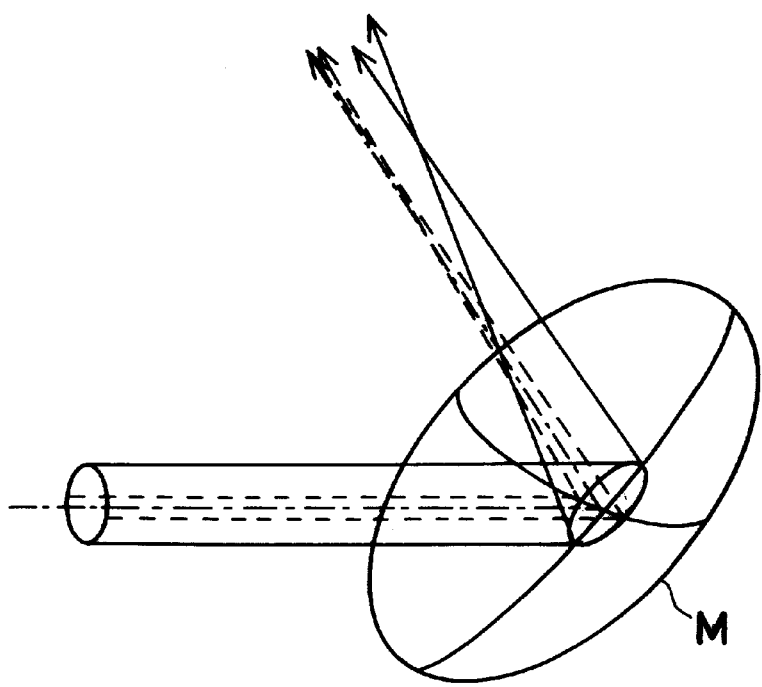
FIG. 15 is a diagram for describing coma produced by a decentered concave mirror.
Figure 16:
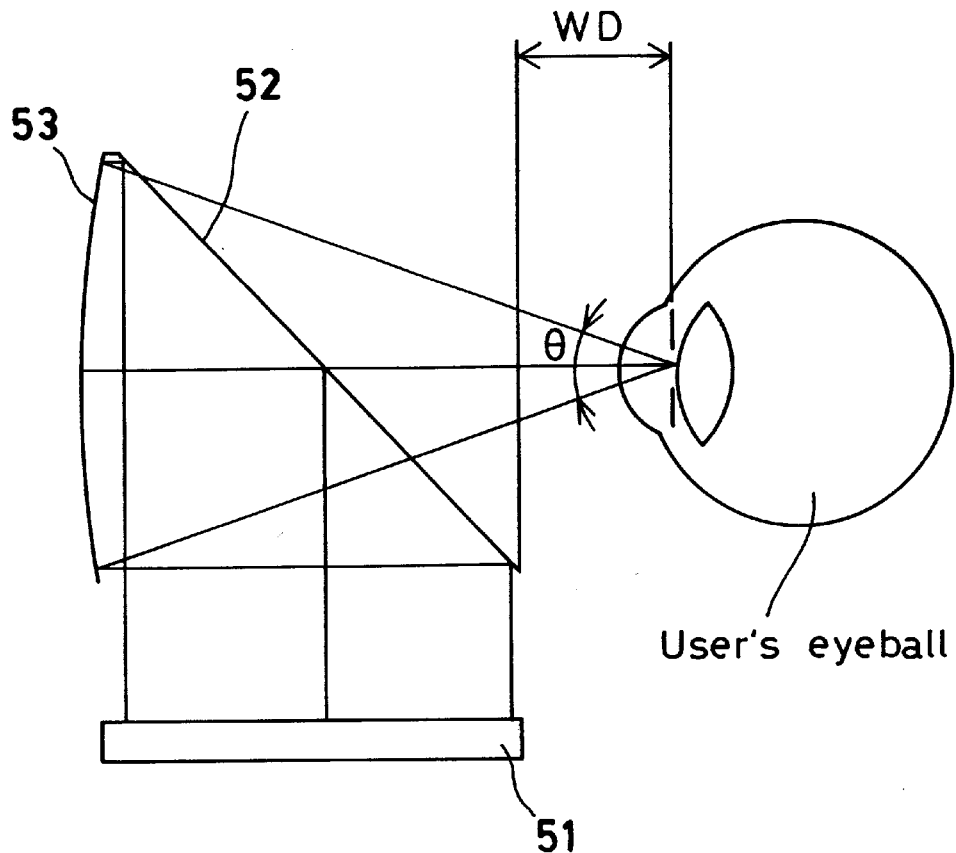
FIG. 16 is a diagram for describing an optical system of a conventional head-mounted display apparatus.
Figure 17:
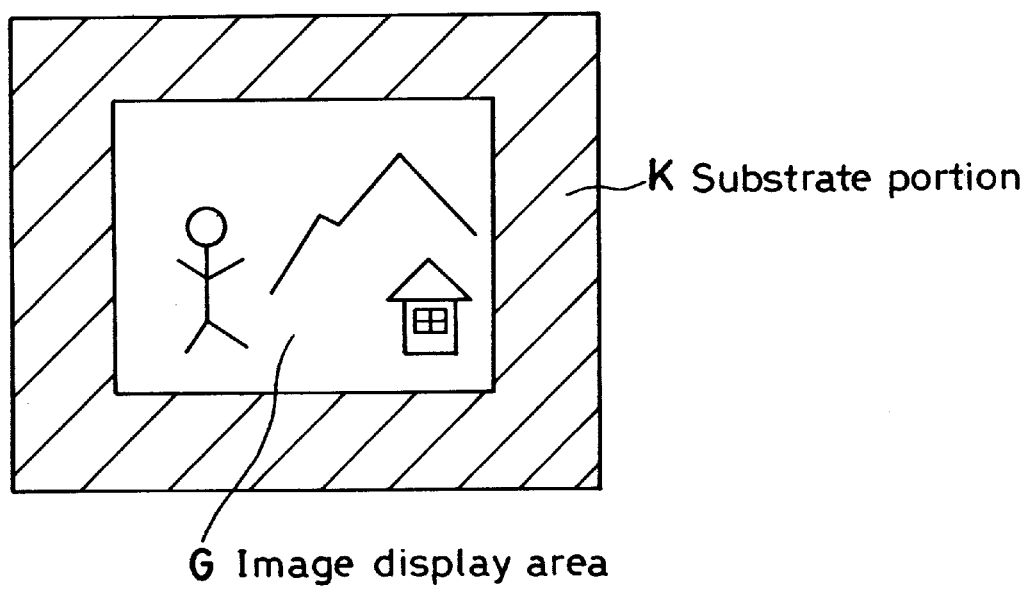
FIG. 17 is a diagram for describing the fact that the image display area of a liquid-crystal display device is surrounded by a substrate portion.

Incidentally, the foregoing visual display apparatus may be arranged either for a single eye or for both eyes. FIG. 10 shows a visual display apparatus arranged for a single eye (in this case, the apparatus is designed for the left eye), and FIG. 11 shows a visual display apparatus arranged for both eyes. FIG. 12 is a top plan view showing the arrangement of left and right ocular optical systems 3L and 3R (assumed to be prism optical systems as in Examples 2 to 5) for left and right eyes 6L and 6R of an observer in the case of a visual display apparatus designed for both eyes.

In FIGS. 10 and 11, reference numeral 31 denotes a display apparatus body unit. In the case of FIG. 10, the display apparatus body unit 31 is supported by a support member through the observer's head such that the display apparatus body unit 31 is held in front of the observer's left eye. In the case of FIG. 11, the display apparatus body unit 31 is supported by a support member through the observer's head such that the display apparatus body unit 31 is held in front of both the observer's eyes. The support member has a pair of left and right front frames 32 each joined at one end thereof to the display apparatus body unit 31. The left and right front frames 32 extend from the observer's temples to the upper portions of his/her ears, respectively. A pair of left and right rear frames 33 are joined to the other ends of the left and right front frames 32, respectively, and extend over the left and right side portions of the observer's head. In the case of FIG. 11, the support member further has a top frame 34 joined at both ends thereof to the other ends of the left and right rear frames 33, respectively, such that the top frame 34 lies over the top of the observer's head.

A rear plate 35 is joined to one front frame 32 near the joint to the rear frame 33. The rear plate 35 is formed from an elastic member, e.g. a metal leaf spring. In the case of FIG. 11, a rear cover 36, which constitutes a part of the support member, is joined to the rear plate 35 such that the rear cover 36 can support the apparatus at a position behind the observer's ear in a region extending from the back part of the head to the base of the neck. A speaker 39 is mounted inside the rear plate 35 or the rear cover 36 at a position corresponding to the observer's ear.

A cable 41 for transmitting external image and sound signals is led out from the display apparatus body unit 31. In the case of FIG. 11, the cable 41 extends through the top frame 34, the rear frames 33, the front frames 32 and the rear plate 35 and projects to the outside from the rear end of the rear cover 36. In the case of FIG. 10, the cable 41 projects from the rear end of the rear plate 35. The cable 41 is connected to a video replaying unit 40. It should be noted that reference numeral 40a in the figures denotes a switch and volume control part of the video replaying unit 40.

The cable 41 may have a jack and plug arrangement attached to the distal end thereof so that the cable 41 can be detachably connected to an existing video deck or the like. The cable 41 may also be connected to a TV signal receiving tuner so as to enable the user to enjoy watching TV. Alternatively, the cable 41 may be connected to a computer to receive computer graphic images or message images or the like from the computer. To eliminate the bothersome cord, the visual display apparatus may be arranged to receive external radio signals through an antenna connected thereto.

As will be clear from the foregoing description, it is possible according to the present invention to obtain a visual display apparatus suitable for use in a head-mounted display apparatus or the like, which uses two or more two-dimensional display devices and which is compact, light-weight and enables an image which is clear as far as the periphery of the observation image field to be observed at a wide field angle and high resolution.

What we claim is:

1. A visual display apparatus having an ocular optical system that leads an image formed by two-dimensional display means to an eyeball of an observer to thereby project the image as an enlarged virtual image, wherein said two-dimensional display means has a first two-dimensional display means and a second two-dimensional display means, and wherein said ocular optical system includes a first surface having both reflecting and transmitting actions, a second surface having at least reflecting action, and a third surface having at least reflecting action, said first surface being disposed to face the observer's eyeball, said second surface being disposed to face said first surface, and said third surface being disposed to face said first surface in a side-by-side relation to said second surface, whereby images displayed by said first and second two-dimensional display means are led to the observer's eyeball.

2. A visual display apparatus according to claim 1, wherein said first surface, second surface and third surface form optical surfaces of a prism member in which a space formed between the three surfaces is filled with a medium having a refractive index (n) larger than 1 (n>1).

3. A visual display apparatus according to claim 2, wherein the image displayed by said first two-dimensional display means and the image displayed by said second two-dimensional display means are identical with each other at at least a portion thereof, and said ocular optical system is formed such that the image led to the observer's eyeball is observed in such a manner that the identical portions of said images are superimposed on one another.

4. A visual display apparatus according to claim 2 or 3, wherein said ocular optical system is arranged such that a bundle of light rays from said first two-dimensional display means passes through said third surface and is reflected by said first surface and then reflected by said second surface, and the reflected ray bundle passes through said first surface and is led to the observer's eyeball, and that a bundle of light rays from said second two-dimensional display means passes through said second surface and is reflected by said first surface and then reflected by said third surface, and the reflected ray bundle passes through said first surface and is led to the observer's eyeball.

5. A visual display apparatus according to claim 4, wherein the reflecting action of said first surface is total reflection caused by a reflection angle which is not smaller than a critical angle.

6. A visual display apparatus according to claim 2 or 3, which has a right ocular optical system for a right eye of the observer and a left ocular optical system for a left eye of the observer.

7. A visual display apparatus according to claim 2 or 3, wherein said second and third surfaces of said ocular optical system are disposed in a side-by-side relation to each other in a horizontal direction with respect to the observer.

8. A visual display apparatus according to claim 2 or 3, wherein, assuming that a plane containing said first two-dimensional display means, said second two-dimensional display means, and an exit pupil of said ocular optical system is a YZ-section, a configuration of said first surface in the YZ-section is concave toward the observer.

9. A visual display apparatus according to claim 2 or 3, wherein, assuming that a plane containing said first two-dimensional display means, said second two-dimensional display means, and an exit pupil of said ocular optical system is a YZ-section, a configuration of each of said second and third surfaces in the YZ-section is concave toward said first surface.

10. A visual display apparatus according to claim 2 or 3, wherein said first surface has a rotationally asymmetric surface configuration.

11. A visual display apparatus according to claim 10, wherein said first surface is formed from a plane-symmetry three-dimensional surface having only one plane of symmetry.

12. A visual display apparatus according to claim 10, wherein said second surface and said third surface each have a rotationally asymmetric surface configuration.

13. A visual display apparatus according to claim 12, wherein said second surface and said third surface are each formed from a plane-symmetry three-dimensional surface having only one plane of symmetry.

14. A visual display apparatus according to claim 13, wherein, assuming that a plane containing said first two-dimensional display means, said second two-dimensional display means, and an exit pupil of said ocular optical system is a YZ-section and a plane perpendicular to said YZ-section is an XZ-section, the plane of symmetry of each of said second and third surfaces lies in one of the XZ-section and a plane parallel to the XZ-section.

15. A visual display apparatus according to claim 2 or 3, wherein said ocular optical system is arranged such that transverse aberration of rays on each of said first and second two-dimensional display means is not more than 50 micrometers in backward ray tracing from an exit pupil of said ocular optical system toward said first and second two-dimensional display means.

16. A head-mounted visual display apparatus according to any one of claims 1 to 3, comprising:

an image display apparatus body unit including said first two-dimensional display means, said second two-dimensional display means, and said ocular optical system; and support means connected to said image display apparatus body unit to support it on a head of said observer so that said image display apparatus body unit is held in front of a face of said observer.

17. A visual display apparatus according to claim 6, which further includes first and second two-dimensional display means for a right eye which form images to be led to the observer's right eye through said right ocular optical system; and first and second two-dimensional display means for a left eye which form images to be led to the observer's left eye through said left ocular optical system.

18. A head-mounted visual display apparatus according to claim 17, comprising:

an image display apparatus body unit including said right ocular optical system, said first and second two-dimensional display means for a right eye, said left ocular optical system, and said first and second two-dimensional display means for a left eye; and support means connected to said image display apparatus body unit to support it on a head of said observer so that said image display apparatus body unit is held in front of a face of said observer.

\* \* \* \* \*